Dec. 30, 1969     L. T. HENDRIX     3,486,848
REFRIGERATED CRYSTALLIZER SYSTEM
Filed Aug. 5, 1966
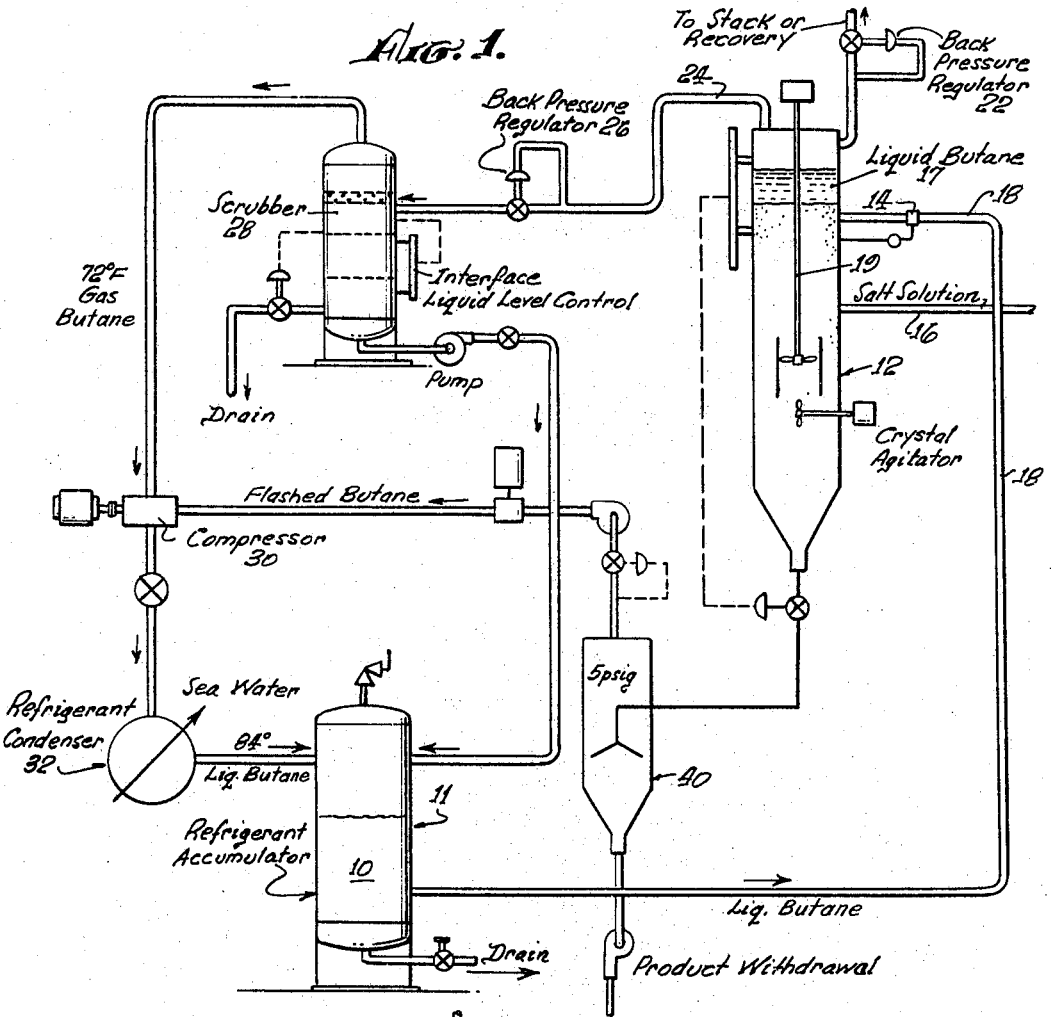
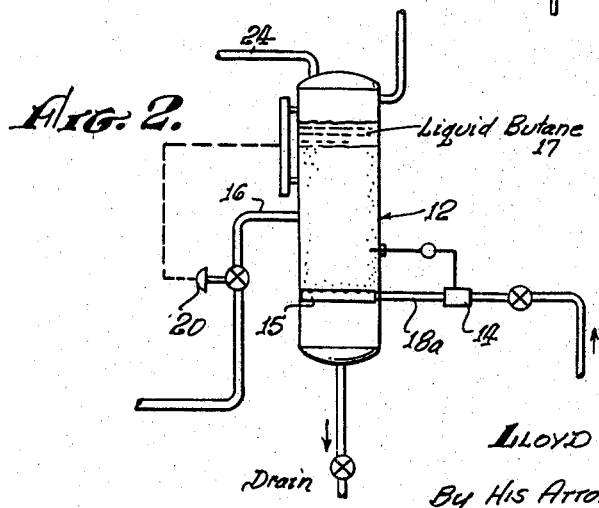
INVENTOR.
LLOYD T. HENDRIX,
By His Attorneys
Spensley & Horn United States Patent Office 3,486,848
Patented Dec. 30, 1969

3,486,848
REFRIGERATED CRYSTALLIZER SYSTEM
Lloyd T. Hendrix, Santa Ana, Calif., assignor to Cosmodyne, Inc., Torrance, Calif., a corporation of California
Filed Aug. 5, 1966, Ser. No. 570,454
Int. Cl. B01d 7/02
U.S. Cl. 23—121
11 Claims

ABSTRACT OF THE DISCLOSURE

The process of recovering a crystallizable solute from its solvent comprising the steps of bringing together a liquid containing a crystallizable solid and a liquefied gas. The liquefied gas being immiscible with the liquid. The crystallizable solute and liquefied gas are then mixed and the gas is allowed to evaporate. Vaporization of the liquefied gas cools the solid containing liquid and causes the solid to separate from the liquid.

---

This invention relates to a method for separating solids from liquid phases containing them in the dissolved or molten state. More particularly this invention relates to a method of obtaining solid substances from their solutions or melts by passing an immiscible liquid refrigerant through the solution thereby reducing its temperature, and causing the substance to separate from the liquid phase in solid form.

One prior art method of obtaining solids from solutions or melts thereof comprises placing in the solution coils through which are circulated a refrigerant such as cooled water or brine. Due to the reduced temperature of the exposed surface of the coils the solution adjacent to them becomes cooled. Supersaturation of the solution occurs adjacent to the cooled surfaces of the coils and the solute precipitates upon the cooled surfaces. In the case of melts, the substance freezes upon the cooled surfaces. This method is initially relatively efficient because of the high thermal conductivity of the coils, however, soon after the process is begun a crust forms on and between adjacent coils. The crust, which has an insulating effect also prevents circulation of solution between adjacent coils; thus the efficiency of the process is greatly reduced. This problem becomes more pronounced with crystalline substances because of the fact that the crystals rapidly bridge the spaces between adjacent coils. Crystals or deposits formed on the refrigerating coils are very adherent and are removed only with difficulty. In many cases extreme mechanical agitation of chipping is required to remove these deposits from on and between the coils. This is a time consuming and expensive procedure which causes shut-down of an otherwise continuous crystal recovery process.

Because of these difficulties other methods of recovery are sometimes substituted. In some cases the refrigerating coils are replaced by thin walled, narrow enclosures having large yieldable planar surfaces from which crystals can be removed by warming or by vibrating the surfaces. In some cases vacuum evaporation may be used but this is often too expensive or impracticable because of the nature of the solid substance. For the recovery of substances which are likely to decompose at elevated temperatures or for those substances which shown inverted solubility curves above certain temperatures recovery techniques involving refrigeration (i.e., crystallization) are the most practicable.

One such method is that described in U.S. Patent No. 2,912,469 entitled Fractional Crystallization Process. By that method a liquid containing a multicomponent chemical composition is contacted with an immiscible liquid sufficiently cool to cause the formation of a solid phase richer in the crystallizable component of the multicomponent composition than the original multicomponent composition. The temperature and rate of introduction of the immiscible liquid is such that it is below the crystallizing temperature of the component to be recovered. The accumulated crystals are then removed to a melt zone and the resulting melt of the desired component is drawn off. The above method also provides for the removal of heat from a multicomponent composition by allowing liquid carbon dioxide or ammonia to vaporize through the melt of such a composition at the same time forming a porous sponge-like solid which will float on the residual liquid.

The above method while probably adequate for the fractional crystallization of organic isomers is inefficient and requires unnecessarily stringent conditions for the separation of inorganic salts from their aqueous solutions. Thus, the liquefication of ammonia requires, for example, a pressure of 181 p.s.i.a. at 90° F. Furthermore these liquids could not easily be utilized for the separation of inorganic salts from aqueous solutions because of their miscibility with aqueous solutions. A further disadvantage of the above method is the tendency of gases under high pressure to form so called clathrate compounds when contacted with aqueous media; these would interfere with pure crystal recovery.

Accordingly it is an object of this invention to provide a method of recovering solids from liquid phases containing them by mixing an immiscible liquid refrigerant with the liquid phase and cooling the liquid phase by evaporation of the liquid refrigerant and causing the solid substance to separate therefrom.

Another object of this invention is to provide a method for continuously removing solid substances from liquid phases containing them.

A further object is to provide a method for continuously producing crystals of uniform and controllable size from a salt solution.

Yet another object is to provide a method of cooling a solid containing liquid phase by mixing therewith an immiscible liquefied hydrocarbon gas and allowing said liquefied hydrocarbon gas to evaporate.

Other objects and advantages of the invention will appear hereinafter.

A broad aspect of the invention comprises the process of bringing together a liquid containing dissolved or molten solid and a liquefied gas, the liquefied gas being immiscible with the liquid; then mixing the solid containing liquid and the immiscible liquefied gas and allowing the liquefied gas to vaporize, thereby cooling the solid containing liquid and causing the solid to separate therefrom. This process eliminates the prior art problems of solid substances crusting on coil surfaces since no coils are immersed in the solution; instead the liquid phase is uniformly and controllably cooled by the vaporization of the liquefied gas intimately mixed therein. It has also been found that the cooling of localized areas of solution by the vaporization liquefied gas provides sites for the initiation of crystallization of salts. Because there are no surfaces from which crystals have to be periodically removed the invented method is efficient and is continuous. Thus crystals or other solids produced by this method can be continuously separated from the supernatant liquid phase and collected, while the evaporated gaseous refrigerant may be condensed and recycled.

It has been found advantageous to use as refrigerants organic liquids which, at ambient pressure and temperature conditions, are gases and which when liquefied are immiscible with the solid containing liquid phase.

The invention is particularly useful for the recovery of Glauber salt (which is the decahydrate of sodium sulfate)

from solutions of sodium sulfate. Crystals of Glauber salt separated from their solution partially dissolve in their own water of hydration at temperatures above 32.4° C. It is therefore desirable to use a method which utilizes cooling techniques (rather than evaporative) in the recovery of these crystals. Using the method of the present invention it is possible to obtain by crystallization Glauber salt crystals of large and uniform size.

The novel features which are believed to be characteristic of the invention, both as to its organization and method of operation, together with further objects and advantages thereof will be better understood from the accompanying drawing in which a presently preferred embodiment of the invention is illustrated by way of example. It is to be expressly understood, however, that the drawing is for the purpose of illustration and description only, and is not intended as a definition of the limits of the invention. The invention will now be described with reference to the drawing wherein:

FIG. 1 illustrates in diagrammatic form a method of practicing the invention.

FIG. 2 illustrates an alternate method of butane feed into the contactor.

The following description is for a preferred embodiment of the invention for the recovery of Glauber salts from sodium sulfate solutions, however, the method is, of course, applicable to the recovery of any solid from a liquid phase containing it.

Referring now to FIG. 1 an organic liquid 10 is stored in accumulator 11. The liquid is preferably a hydrocarbon or mixture of hydrocarbons which at atmospheric pressures and temperatures is a gas and which can be liquefied at moderate temperatures and pressures. The hydrocarbon gases or mixtures thereof which can be used in the process of the present invention can be liquefied within the range 30 p.s.i.a. and 90° F. to 90 p.s.i.a. and 90° F. The liquefied gas is immiscible with the liquid phase from which a solid substance is to be separated. In the recovery of Glauber salt the liquefied gas is immiscible with aqueous solutions of sodium sulfate. Gases which have been found to perform satisfactorily in the invention are hydrocarbons having from 3 to 5 carbon atoms, including normal butane, Freon 115, Freon 21 and mixtures thereof. Under varied temperature and pressure conditions normal pentane and propane may also be used. The use of normal pentane requires negative pressures and is hazardous unless explosion proof equipment and other precautions are taken. In the preferred embodiment of the invention liquefied normal butane is used to recover Glauber salt from sodium sulfate solutions. The normal butane can be liquefied at a pressure of 44 p.s.i.a. and at a temperature of 84° F. The use of other hydrocarbon gases requires the selection of the appropriate pressure and temperature conditions for liquefication and for vaporization which can be determined from a standard work such as the Chemical Engineers Handbook, Perry, 3rd ed.

A liquid phase containing dissolved solid or solid as a melt is fed into a contactors 12 at a temperature above that at which the solid substance crystallizes or otherwise separates out. In the presently preferred embodiment of the method of the invention concentrated sodium sulfate solution 16 at a temperature of approximately 92° F. is fed into the contactor 12 which typically is a vertically oriented tubular vessel.

A low boiling organic liquid comprising a liquefied hydrocarbon gas or a mixture of liquefied hydrocarbon gases is fed into the contactor 12 through conduit 18 at a point below the liquid level of the sodium sulfate solution. For the recovery of Glauber salt liquid normal butane (hereafter referred to as liquid butane) is the preferred immiscible organic liquid utilized. A conventional mechanical mixer 19 situated so that it creates a downdraft mixing effect, thoroughly disperses the liquid butane throughout the salt solution. The liquid butane being immiscible with the salt solution is dispersed throughout the solution in the form of droplets.

It is, of course, within the scope of the invention to disperse the solid containing liquid phase throughout the immiscible organic liquid phase which has been previously fed into the contactor. Thus hot salt solution could be fed into a contactor containing cool butane and mixed until dispersion has occurred, and cooling of the salt solution has taken place.

It has been found advantageous to deposit and maintain a layer 17 of liquid butane upon the top surface of the salt solution. It has been found that such a layer of liquid butane reduces excessive foaming of the salt solution while mixing is taking place; this to a large extent prevents agglomeration of small crystals and make possible the recovery of large crystals of uniform size.

In alternative embodiment of the invention, liquid butane may be fed into contactor 12 at 18a (FIG. 2) through a perforated plate 15 having a plurality of approximately 1/16" openings therethrough. The liquid butane can be injected through the openings of the plate at a velocity sufficient to provide a thorough mixing action (5 or 6 feet per second has given satisfactory results) resulting in the dispersion of liquid butane droplets throughout the solution.

The vapor pressure within contactor 12 is controlled by back pressure regulator 26. The vapor pressure within the contactor is controlled at a sufficiently low pressure to allow liquified gas to evaporate at a required temperature. In the process of the present invention the evaporation of liquid butane lowers the temperature of the sodium sulfate solution locally by removing heat from the sodium sulfate solution to the evaporating butane as latent heat of vaporization. Only an insignificant amount of heat is removed from the sodium sulate solution as sensible heat. Liquid butane is fed into the contactor at 84° F. and exits in the gaseous state at 72° F. Thus, the temperature of a given quantity of salt solution can be controlled by controlling the vapor pressure within the contactor such that liquid butane will start to evaporate at a predetermined temperature and will cool and maintain the salt solution at the desired crystallizing temperature. In the presently preferred embodiment of the invention optimum results have been obtained (when using liquid butane) when the pressure in contactor 12 is maintained in the range 27–30 p.s.i.a. This pressure range should be maintained to within ±0.1 p.s.i.a. At this pressure the liquid butane evaporates at 69° F. and the salt solution is cooled from 92° F. to approximately 72° F. at which temperature the solution becomes supersaturated and crystals of Glauber salt are formed.

A continuous flow of liquid butane is provided to contactor 12 through conduit 18, which is situated below the top level of the liquid phase to be cooled. Temperature control 14 regulates the amount of liquid butane introduced into the contactor according to the temperature of the salt solution. If, for example, the salt solution temperature is not sufficiently low for crystallization a larger volume of liquid butane is automatically fed into the contactor to provide more cooling.

It has been found that droplets of a liquified gas intimately dispersed through the solid contacting liquid phase evaporate and super cool localized areas of the liquid phase thereby causing crystals to form. These crystals in turn become sites for the initiation of further crystal growth. Thus, evaporating droplets of liquefied gas serve not only to cool the liquid phase to a crystallizing temperature but also to uniformly seed the liquid phase thereby causing further crystallization to occur. In the most preferred embodiment of the process of this invention liquid butane droplets dispersed through an aqueous sodium sulfate solution evaporate thereby cooling the salt solution as described hereinbefore and causing crystals of Glauber salt to separate from the solution. Crystallization of Glauber salt, once initiated proceeds rapidly and the formed crystals constitute a slurry which can be periodically, or continuously if desired, withdrawn from the contactor.

The purity of Glauber salt crystals obtained by the above described method can be controlled by holding the crystallizing temperature at 72 F.±1° F., and within this narrow temperature range crystals have been obtained which are 94% sodium sulfate decahydrate with the remaining 6% being entrained solvent and other impurities. With liquid butane and contactor pressure of 27–30 p.s.i.a. the size of crystals which have been obtained are 99% retained by U.S. Seive No. 60 and 80% retained by U.S. Sieve No. 30.

The gaseous butane in the contactor is withdrawn through conduit 24 and through back pressure regulator 26 to a conventional scrubber 28 where it is purified. The gas, at a temperature of 72° F., is then compressed by a compressor 30 and liquified in condenser 32. Liquid normal butane at 44 p.s.i.a. pressure of 84° F. is stored in accumulator 11 for recycling in the process.

A slurry of Glauber salt crystals in solution at a temperature of approximately 72° F. can be continuously, or periodically if more convenient, withdrawn from the contactor. The crystals are separated from the solution by conventional means such as, decanting or by centrifuging. It is also, within the scope of the invention to pass the slurry through a depressurizer-separator 40 which has a reduced atmospheric pressure (e.g., 5 p.s.i.a.). Dissolved or entrained butane is thus, flashed off prior to separating the crystals from the solution by means such as centrifuging.

The level of solution in the contactor is maintained approximately constant by the liquid level control 20 which causes new salt solution to enter the contactor through conduit 16 as the slurry is being withdrawn and the liquid level in the contactor dips.

For a continuous process carried out according to the most preferred process of this invention for recovering a solid from a liquid phase containing it and employing a liquified hydrocarbon gas as the refrigerant, the continuous operation is carried out in the following manner. An aqueous salt solution is fed into a vertically oriented tubular vessel near the upper end thereof until a required liquid level is attained in the vessel. An immiscible liquefied hydrocarbon gas is fed into the vessel near the upper end thereof. The liquefied gas being less dense than the salt solution forms a liquid layer above the aqueous salt solution. A conventional mechanical mixer of the downdraft type is employed to disperse the liquid layer throughout the salt solution in the form of droplets. The vapor pressure within the tubular vessel is maintained at a range such that the liquefied gas vaporizes at a predetermined rate and temperature. Thus, heat is removed as latent heat of vaporization from the salt solution by the vaporization of the liquefied gas. When the salt solution becomes cooled to the crystallizing temperature each vaporizing droplet of liquefied gas becomes the site of crystal formation, each crystal so formed in turn seeds the liquid phase thereby accelerating further crystallization. The resulting slurry consisting of mother liquor and crystals is continuously discharged from the contactor into a depressurizer-separator where any entrained liquefied gas is flashed off. The slurry is then separated into its solid and liquid phases by centrifugation. The vaporized gas is passed through a compressor and then condensed; the liquefied gas is recycled as the process is continued.

The following specific example is intended as illustrative of the process of this invention and it is not desired or intended that it be a limitation thereon.

EXAMPLE I

A boric acid solution of Glauber salt at a temperature of approximately 94° F. and containing approximately 25% by weight of Glauber salt is fed into a vertical tubular contactor until a required liquid level is achieved. A layer of liquid butane (2 feet deep) is established on top of the salt solution. The vapor pressure within the contactor is controlled by setting the back pressure regulator at 42 p.s.i.a. The pumps and the mixer are then started and the contactor pressure is lowered to a desired operating level of 27 p.s.i.a. The plant is put on automatic controls and the boric acid solution of Glauber salt is fed into the contactor at the rate of 165 gallons per minute. Liquid normal butane at 84° F. is fed ino the contactor at the rate of 134 gallons per minute and is vaporized at a pressure of 27 p.s.i.a. Under these conditions the solution is cooled to approximately 72° at which temperature Glauber salt crystals are formed. A temperature of approximately 72° F. is maintained in the slurry as it leaves the contactor. Slurry is withdrawn from the contactor on a continuous basis and new salt solution added at a rate such that the liquid level in the contactor remeans substantially constant. The slurry is fed into a depressurizer-separator having a vapor pressure of 5 p.s.i.a.; any entrained or dissolved butane is flashed off and the mother liquor and Glauber salt crystals are separated by centrifuging. The plant can remain on stream operating automatically until any maintenance is required. Using the described process, large high purity Glauber salt crystals are recovered with a yield of approximately 98% of theoretical. The evaporated butane is compressed, condensed and recycled, with an average daily loss of approximately 40 gallons.

It will be apparent from the foregoing description of the invention that although described in terms of recovering Glauber salt from a solution of sodium sulfate the process has many other applications requiring the cooling of a liquid phase to recover a crystalline or non-crystalline solid therefrom. One of the advantages of the invented process over prior are processes is that a liquid phase can be efficiently cooled and its temperature uniformly controlled to within ±1° F. Cooling of the liquid phase can be accomplished without the immersion into the body of the solution of refrigerating coils or any other cooling surfaces. The ability to closely control solution temperatures makes possible the recovery of crystals of a large and uniform size. The problems of crystal bridging and of crystals tenaceously clinging to cooling surfaces has therefore been alleviated. Another advantage is that the process is a continuous one. The process is also more efficient than prior art processes because it depends upon cooling by removing heat as latent heat of vaporization rather than as sensible heat. Crystals produced by this method are of a uniform size which can be controlled by selecting a desired rate of cooling with a requisite salt solution concentration. A further advantage of this process is that it utilizes hydrocarbon gases that can be easily liquefied without the necessity of stringent temperature or pressure conditions and which are immiscible with aqueous liquid phases.

What is claimed is:
1. The process of recovering Glauber salts decahydrate from its solution comprising the steps of:
bringing together separately and continuously into a contactor an aqueous solution of Glauber salt and an immiscible liquefied gas;
intimately mixing said salt solution and said liquefied gas such that the liquefied gas is dispersed throughout the salt solution in the form of droplets;
said salt solution and the liquefied gas being mixed under such conditions that a two phase system is formed;
forming a layer of predetermined thickness of liquefied gas phase upon the upper surface of the aqueous salt solution phase;
controlling pressure and temperature within said contactor such that said liquefied gas vaporizes thereby cooling said salt solution and decreasing the solubility of the decahydrate salt therein thereby causing salt crystals to form in said contactor.

2. The process of claim 1, wherein said immiscible liquefied gas is fed into said contactor at a temperature within the range 69° F. to 84° F.

3. The process of claim 1, wherein said liquefied gas or gas mixture is selected from the group consisting of propane, normal butane, pentane, Freon 21 Freon 115.

4. The process of claim 3, wherein said hydrocarbon gas or mixture of hydrocarbon gases can be liquefied at moderate pressure, and temperature conditions ranging from 30 p.s.i.a. and 90° F. to 90 p.s.i.a. and 90° F.

5. The process of claim 1, wherein said vapor pressure within said contactor is controlled by a back pressure regulator such that said liquefied gas will vaporize at a predetermined temperature, and wherein said liquefied gas is feed regulated into said contactor according to said temperature of said solution in said contactor.

6. The process of claim 1, wherein the temperature of said liquefied gas entering said contactor is above the crystallizing temperature of said salts in said solution and wherein the pressure required to liquify said gas at said temperature is less than 90 p.s.i.a.

7. The process of crystallizing salt from a solution thereof comprising the steps of:
  feeding into a contractor and intimately mixing a salt solution and liquefied hydrocarbon gas, the liquefied gas being immiscible with said salt solution;
  controlling the pressure within said contractor by means of a back pressure regulator such that the liquefied gas vaporizes thereby cooling said salt solution to a temperature within the range of 71° F. to 73° F. and causing said salt to form crystals and to separate from said solution;
  separating the crystals from the mother liquor by centrifuge means;
  forwarding the separated crystals to a depressurizer and to means for flashing the refrigerant in the depressurizer; and,
  passing vaporized refrigerant through a return line, through a scrubber and to a compressor and recycling it.

8. The process of crystallizing Glauber salt from a solution of sodium sulfate comprising the steps of:
  feeding into a single contactor and intimately mixing said sodium sulfate solution and a liquefied gas, said liquefied gas being immiscible with said sodium sulfate solution, said liquefied gas being dispersed within said solution in the form of droplets;
  controlling the pressure within said contactor in a range between 27 and 30 p.s.i. such that said liquefied gas vaporizes thereby cooling said solution sufficiently to decrease the solubility of Glauber salt contained therein and causing said salt to form crystals in said contactor and to separate from solution.

9. The process of crystallizing Glauber salt from a solution of sodium sulfate comprising the steps of:
  feeding into a single contactor and intimately mixing said sodium sulfate solution and a liquefied gas, said liquefied gas being immiscible with said sodium sulfate solution, said liquefied gas being dispersed within said solution in the form of droplets;
  controlling the pressure within said contactor such that said liquefied gas vaporizes thereby cooling said solution sufficiently to decrease the solubility of the Glauber salt contained therein and causing said salt to form crystals in said contactor and to separate from said solution and in which said solution is maintained at a salt crystallizing temperature in the range of 71° F. to 73° F. by the cooling effect of said vaporizing liquefied gas.

10. The process of removing Glauber salt from a sodium sulfate solution comprising the steps of:
  bringing together into a contactor a sodium sulfate solution containing crystallizable Glauber salt and a liquefied gas, said liquefied gas being substantially immiscible with said solution;
  mixing said solution containing crystallizable Glauber salt and said immiscible liquefied gas until the immiscible liquefied gas is dispersed throughout said solution in the form of small droplets;
  forming a blanket of immiscible liquefied gas upon the surface of said solution;
  allowing said liquefied gas droplets to vaporize cooling said solution to a temperature range of 71° F. to 73° F. with the pressure in said contactor being maintained at a pressure in the range of 27 to 30 p.s.i.a. thereby decreasing the solubility of said Glauber salt and causing said salt to separate from said solution.

11. The process of claim 10, wherein said immiscible liquefied gas is selected from the group consisting of propane, normal butane, pentane, Freon 21 and Freon 115.

References Cited

UNITED STATES PATENTS

| | | |
|---|---|---|
| 2,886,603 | 5/1959 | Shelton. |
| 3,102,908 | 9/1963 | Raynes. |
| 3,177,673 | 4/1965 | Svanoe _____ 62—58 |
| 3,298,796 | 1/1967 | Van Damme et al. ___ 62—58 X |
| 2,683,178 | 7/1954 | Findlay. |
| 3,269,136 | 8/1966 | Umand _____ 62—58 |

FOREIGN PATENTS

| | | |
|---|---|---|
| 217,766 | 3/1958 | Australia. |
| 811,468 | 4/1959 | Great Britain. |
| 70,507 | 6/1946 | Norway. |

NORMAN YUDKOFF, Primary Examiner

U.S. Cl. X.R.

23—273; 62—58, 302